United States Patent
Nikkels et al.

(10) Patent No.: US 6,291,773 B1
(45) Date of Patent: Sep. 18, 2001

(54) APPARATUS AND METHOD FOR PRECLUDING FLUID WICKING

(75) Inventors: Robert Nikkels; Dave Van den Berg, both of Minden, NV (US)

(73) Assignee: Bently Nevada Corporation, Minden, NV (US)

( * ) Notice: Subject to any disclaimer, the term of this patent is extended or adjusted under 35 U.S.C. 154(b) by 0 days.

(21) Appl. No.: 09/259,243

(22) Filed: Feb. 26, 1999

Related U.S. Application Data

(62) Division of application No. 08/390,136, filed on Feb. 17, 1995, now Pat. No. 5,876,528.

(51) Int. Cl.[7] .............................. H01B 7/00; H01B 11/06
(52) U.S. Cl. ................................. 174/120 R; 174/110 R; 174/36
(58) Field of Search ..................................... 174/103, 104, 174/20, 25 C, 35 R, 28, 105 R, 110 R, 120 R

(56) References Cited

U.S. PATENT DOCUMENTS

| | | |
|---|---|---|
| 252,249 | 1/1882 | Philips . |
| 1,769,524 | 7/1930 | Maple . |
| 2,782,248 | 2/1957 | Clark . |
| 3,180,926 | 4/1965 | Trill . |
| 3,532,575 | 10/1970 | Nagata et al. . |
| 3,639,201 | 2/1972 | Humphries . |
| 3,643,007 * | 2/1972 | Roberts et al. ...................... 174/106 |
| 3,739,073 | 6/1973 | Schneider et al. . |
| 3,743,748 * | 7/1973 | Reeder ............................... 174/75 C |
| 3,789,099 | 1/1974 | Garrett et al. . |
| 3,795,224 * | 3/1974 | Batson et al. ........................ 118/308 |
| 3,836,695 | 9/1974 | Strecker et al. . |
| 3,860,824 * | 1/1975 | Stone .................................. 250/390 |
| 3,885,380 | 5/1975 | Hacker . |
| 3,948,102 * | 4/1976 | Coon ..................................... 73/398 |
| 3,982,060 * | 9/1976 | Avery et al. ........................ 174/75 C |
| 4,177,097 | 12/1979 | Hudson, Jr. et al. . |
| 4,227,043 | 10/1980 | Stöhr et al. . |
| 4,317,002 | 2/1982 | Spicer . |
| 4,339,733 * | 7/1982 | Smith .................................. 333/237 |
| 4,376,920 * | 3/1983 | Smith ................................... 333/12 |
| 4,385,203 | 5/1983 | Faranetta et al. . |
| 4,461,110 * | 2/1987 | Smith ................................... 333/12 |
| 4,599,487 | 7/1986 | Blank et al. . |
| 4,641,110 * | 2/1987 | Smith ................................... 333/12 |
| 4,673,231 * | 6/1987 | McAnulty, Sr. ..................... 439/587 |
| 4,727,262 * | 2/1988 | O'Loughlin ......................... 307/106 |
| 4,746,281 | 5/1988 | Laugs et al. . |
| 4,801,803 * | 1/1989 | Denen et al. ..................... 250/336.1 |
| 4,845,309 | 7/1989 | Vincent et al. . |
| 4,998,004 * | 3/1991 | Lawrence et al. .............. 219/121.13 |
| 5,000,539 * | 3/1991 | Gareis ................................ 350/96.23 |
| 5,041,950 | 8/1991 | Tyson . |
| 5,072,073 * | 12/1991 | Becker et al. .......................... 174/76 |
| 5,150,442 * | 9/1992 | Desmons .............................. 385/101 |
| 5,151,143 | 9/1992 | Downie . |
| 5,295,120 * | 3/1994 | McShane ............................. 367/908 |
| 5,457,288 * | 10/1995 | Olsson ............................. 174/117 R |
| 5,475,219 * | 12/1995 | Olson ................................. 250/336.1 |

(List continued on next page.)

*Primary Examiner*—Dean A. Reichard
*Assistant Examiner*—William H. Mayo, III
(74) *Attorney, Agent, or Firm*—Dennis DeBoo

(57) ABSTRACT

A method and a resulting cable (10) is disclosed which precludes fluid wicking within the interior of the cable (10) by impregnating the cable (10) with a sealing composition and curing the sealing composition therein. The cable (10) includes an ultimate strata (18), a penultimate strata (20) and a central strata (40) concentrically disposed. The central strata (40) includes a central signal transmission medium (44) separated from the penultimate strata (20) by a central insulator or dielectric (42). The penultimate strata (20) includes a braided sheath (32) circumscribing a braided conductor (22) and an insulator (30) interposed therebetween. The ultimate strata (18) surrounds the interior or the penultimate strata (20) and central strata (40) of the cable (10).

30 Claims, 6 Drawing Sheets

U.S. PATENT DOCUMENTS

| | | | | |
|---|---|---|---|---|
| 5,539,323 | * | 7/1996 | Davis, Jr. | 324/690 |
| 5,685,884 | * | 11/1997 | Van Den Berg | 29/595 |
| 5,712,562 | * | 1/1998 | Berg | 324/207.16 |
| 5,729,150 | * | 3/1998 | Schwindt | 324/762 |
| 5,770,941 | * | 6/1998 | Van Den Berg | 324/270.16 |
| 5,818,224 | * | 10/1998 | Van Den Berg | 324/207.16 |
| 5,841,737 | * | 11/1998 | Schaefer | 367/147 |
| 5,856,645 | * | 1/1999 | Norton | 200/61.53 |
| 5,903,306 | * | 5/1999 | Heckendorn et al. | 348/85 |

* cited by examiner

APPARATUS AND METHOD FOR PRECLUDING FLUID WICKING

This is a divisional of application Ser. No. 08/390,136, filed Feb. 17, 1995, Patented Mar. 2, 1999, as U.S. Pat. No. 5,876,528.

FIELD OF THE INVENTION

The present invention relates generally to precluding fluid wicking and, in particular, to precluding fluid wicking within an interior of a cable.

BACKGROUND OF THE INVENTION

A wide variety of applications in the industry of monitoring the characteristics of rotating machinery require at least one transducer or sensor to be internally mounted within a machine case. A mounting bracket may be used to strategically mount the transducer and a cable associated with the transducer is routed out of the machine case. The routing of the cable through the machine case is usually through an adapter which includes some type of rubber grommet. The rubber grommet prevents leakage of fluid through the case via an outer surface of the cable.

Typically, a junction box is mounted on or near the exterior of the machine case and encloses the connections between the transducer cable and an extension cable that is used to route the output of the transducer to a processing unit.

As noted, the rubber grommet adequately prevents fluid from exiting through the machine case via the outer surface of the cable. However, a long felt problem in the industry still exists in that the fluid permeates through cuts and cracks in the outer jacket of the cable and is wicked up by the interior and particularly the braiding of the cable and is thus allowed to flow directly to the junction box or onto a shop floor. This not only causes a safety hazard, but an environmental hazard as well. As a result, the junction box must be periodically drained of fluid and/or the shop floor cleaned.

In addition, fluid may penetrate to the interior of the cable by way of a transition area between the transducer and one end of the cable. Furthermore, the tip of the transducer itself may become damaged and allow an entry for fluid to be wicked up by the interior and particularly the braiding of the cable.

SUMMARY OF THE INVENTION

The present invention solves the problem of fluid wicking within the interior of a cable such that the fluid is drawn from within a machine case to an outside environment. This is achieved through a process of impregnating the cable with a special sealing composition such as that sold by Loctite under the name "Flexseal XT". This material is a liquid and is designed to cure when it reacts with an activator-type of material such as copper. If the cable being used does not include an activator-type of material, an additional problem arises in how this liquid composition is to be cured once it has been impregnated into the cable. Impregnating the cable with the sealing composition and then curing the sealing composition within the cable are some of the problems the present invention addresses.

A triaxial cable will be employed in describing the method used for successfully impregnating the cable with the sealing composition and curing this composition so that it precludes fluid wicking therethrough.

A typical triaxial cable includes an ultimate strata, a penultimate strata and a central strata concentrically disposed. The central strata includes a central signal transmission medium separated from the penultimate strata by a central insulator or dielectric. The penultimate strata includes a braided sheath circumscribing a braided conductor and an insulator interposed therebetween. The ultimate strata surrounds the interior or the penultimate strata and central strata of the cable.

The first step in impregnating the cable with the sealing composition is to provide a leakage path for the sealing composition to pervade within the interior of the cable. This is accomplished by cutting the cable to a desired length and then removing any crimping of the cable due to the cutting action. In addition, if the ends of the braided conductor and/or sheath are soldered, one must be careful that the wicking of the solder paste and flux do not completely seal off the ends of the cable.

At this time it is preferred that both ends of the cable are stripped in a step-like fashion in order to expose a desired length of the braided conductor, the braided sheath and the central signal transmission medium. As will be delineated below, this allows the ends of the cable to retain their original flexibility after the process of curing the sealing composition is completed.

Once the cable is provided with ample leakage paths, it is placed within a basket. The ends of the cable are coupled to the basket in an elevated position such that when the liquid composition has been impregnated into the cable it does not flow back out.

Now that the cable has been properly coupled to the basket, the basket is placed within a chamber of a machine. The chamber of the machine is sealed and a pressure differential, i.e., a vacuum, is applied thereby providing a pull system for exhausting gas from the interior of the cable and from the substantially moisture free chamber. The liquid composition is then added in order to submerge the cable or at least come in contact with one or more leakage paths provided at one or both ends of the cable. The pressure differential (vacuum) is continuously applied during the process of adding the sealing composition. This pressure differential pulls out any air bubbles which have formed within the solution itself or within the cable.

Once this step of the process is completed, the pressure differential (vacuum) is removed and the chamber is bled back to room pressure. Then, the fluid is applied under pressure. The added pressure in the chamber forces the sealing composition within the interior of the cable. This is the actual impregnation step of the process.

The next step is to bleed off the pressure of the chamber so that it is brought back down to room pressure. The chamber is then opened and the basket is removed from the bath of sealing composition. The basket is then spun in order to remove any of the excess sealing composition from the exterior of the exposed cable. This is done in a manner that allows the uncured sealing composition to be retained within an intermediate portion of the cable.

Next, the cable is washed by agitating the basket up and down in a warm bath of water and mild detergent. After the first warm bath, the basket is placed into a second bath of clean water and then into an activator solution.

The washing cycle completely cleans the liquid composition out of the ends of the cable which have been exposed by the stripping process and also off the exposed cable. Even though the exposed ends of the cable have been rinsed clean of the sealing composition the rest of the cable remains completely impregnated.

The temperature of the solutions used in the washing cycle are elevated in order to partially cure the sealing composition impregnated into the cable.

Finally, the basket having the ends of the cable still coupled thereto is put into an oven and baked. The cable becomes semi-rigid after the sealing composition is completely cured in the oven. However, the length of cable which runs from the very ends of the cable to where the ultimate strata begins retains its original flexibility as a result of the sealing composition being washed out.

The need for flexibility at one end of the cable is particularly important because it is required to make several very sharp angle bends when operatively coupled to a transducer. In addition, the ends of the cable may be required to make an additional sharp angle bend at an area where they exist at a back end of the transducer or a connector.

OBJECTS OF THE INVENTION

A primary object of the present invention is to provide a new and novel method of precluding fluid wicking within the interior of a cable.

A further object of the present invention is to provide a cable as characterized above which is impregnated with a sealing composition.

Another further object of the present invention is to provide a cable as characterized above wherein the sealing composition which is impregnated into the cable has been properly cured.

Another further object of the present invention is to provide a cable as characterized above which allows a length at one or both ends of the cable to retain its original flexibility after the sealing composition has cured.

Viewed from a first vantage point, it is an object of the present invention to provide a cable, comprising in combination: a first end and a second end; a conductor communicating the first end with the second end; an insulator circumscribing the conductor; and a sealing composition impregnated into at least one area of tangency between the conductor and the insulator wherein the sealing composition precludes fluid wicking and capillary attraction of the fluid along the conductor.

Viewed from a second vantage point, it is an object of the present invention to provide a cable which communicates parameters of rotating machinery from a end and a second end; a central strata including a central signal transmission medium extending from the first end to the second end; a penultimate strata circumscribing the central strata; an ultimate strata circumscribing the penultimate strata; and means for precluding fluid wicking and capillary attraction of fluid between the penultimate strata and the ultimate strata.

Viewed from a third vantage point, it is an object of the present invention to provide a method for precluding fluid wicking between a transducer which monitors status of rotating machinery and a processing unit which receives the signal from the transducer, the steps including: impregnating a cable with a sealing composition, and curing the sealing composition within the cable to render the interior of the cable substantially impervious to fluid wicking.

Viewed from a fourth vantage point it is an object of the present invention to provide a cable for use in monitoring the status of rotating equipment having a sensor which generates a signal, a signal processor which interprets the signal, the cable interposed between the sensor and the signal processor and formed from the steps of: infusing sealing composition into at least one area of an interior of the cable; coagulating the sealing composition within the interior of the cable to render the interior of the cable substantially impervious to fluid wicking and capillary attraction of fluid within the interior of the cable.

These and other objects will be made manifest when considering the following detailed specification when taken in conjunction with the appended drawing figures.

DESCRIPTION OF PREFERRED EMBODIMENTS

Figure 1:
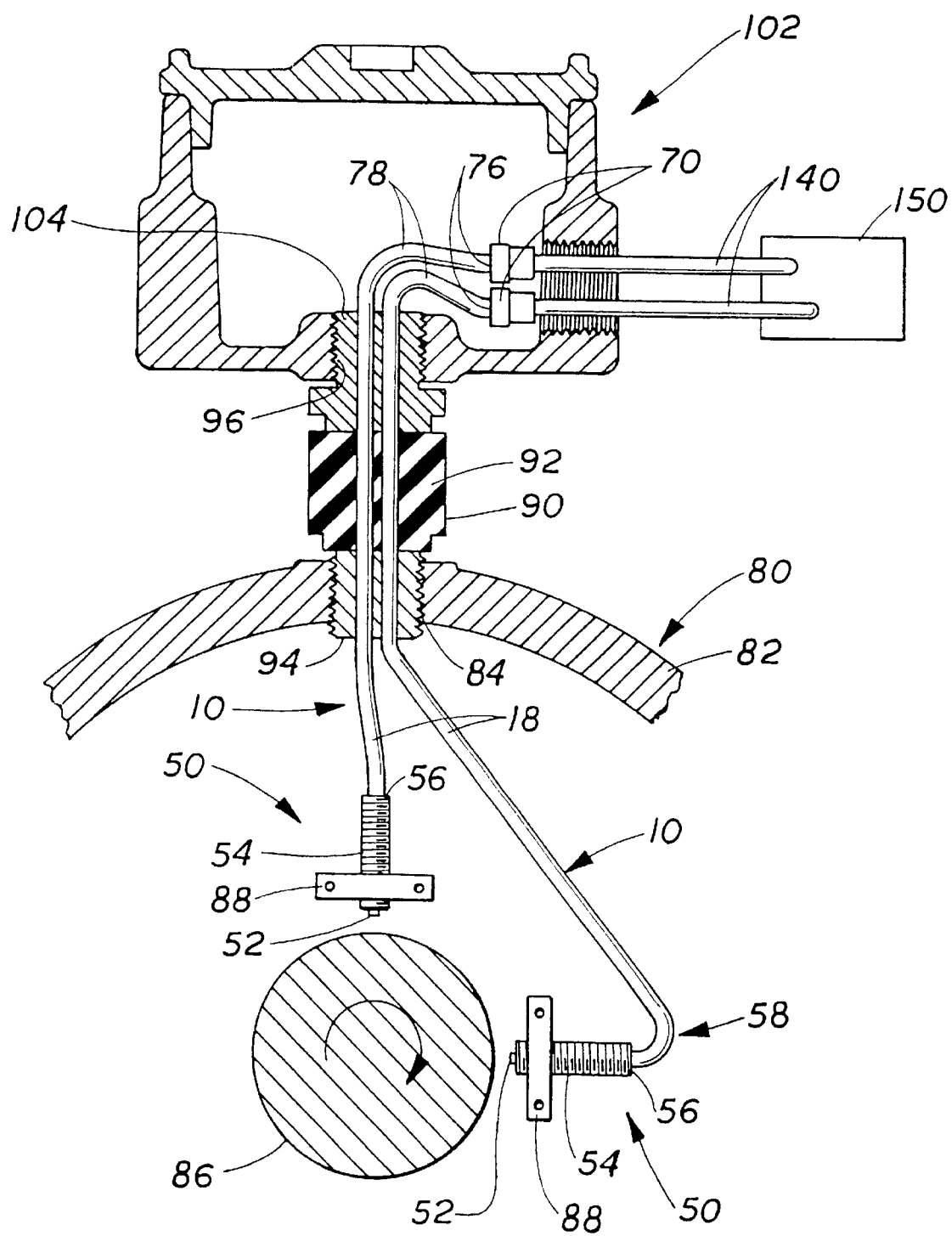
FIG. 1 is an elevational view of a cable according to the present invention which is shown communicating parameters of a machine from a transducer juxtaposed to a rotating shaft to a processing unit remote from the machine.

Considering the drawings, wherein like reference numerals denote like parts throughout the various drawing figures, reference numeral 10 is directed to the cable according to the present invention.

Figure 2:
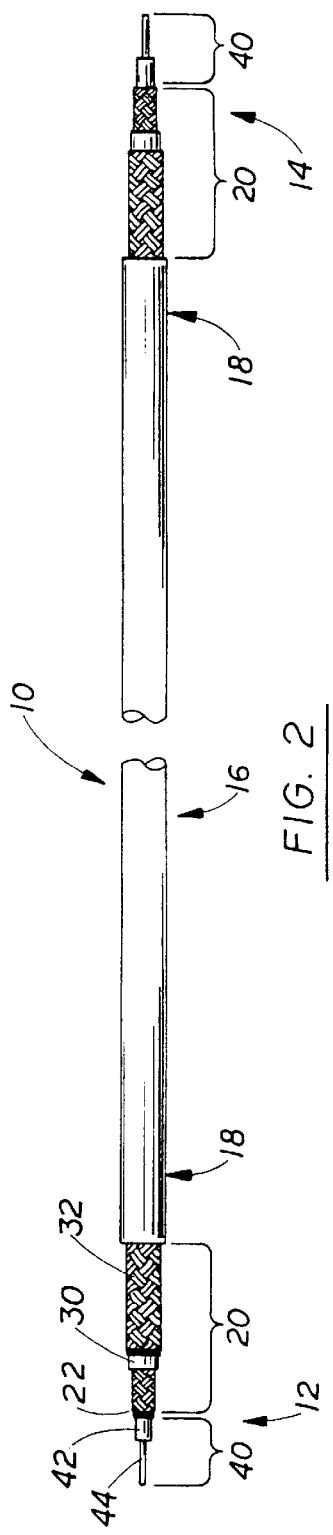
FIG. 2 is a perspective view of the cable with both ends stripped in a step-like fashion.

In essence, and referring to FIGS. 1 and 2, a cable 10 is provided which precludes fluid wicking between for example, a sensor such as a transducer 50 which monitors the status of a rotating machine 80 and a processing unit 150 which receives a signal from the transducer 50. The cable 10 is comprised of a first end 12 and a second end 14. An intermediate portion 16 of the cable 10 communicates the first end 12 with the second end 14. The intermediate portion 16 is formed from plural stratas preferably concentrically disposed.

The plural stratas forming the intermediate portion 16 are comprised of an ultimate strata 18 circumscribing an interior of the cable 10 which includes a penultimate strata 20 surrounding a central strata 40. The penultimate strata 20 is preferably comprised of at least one braided conductor 22.

Figure 10:
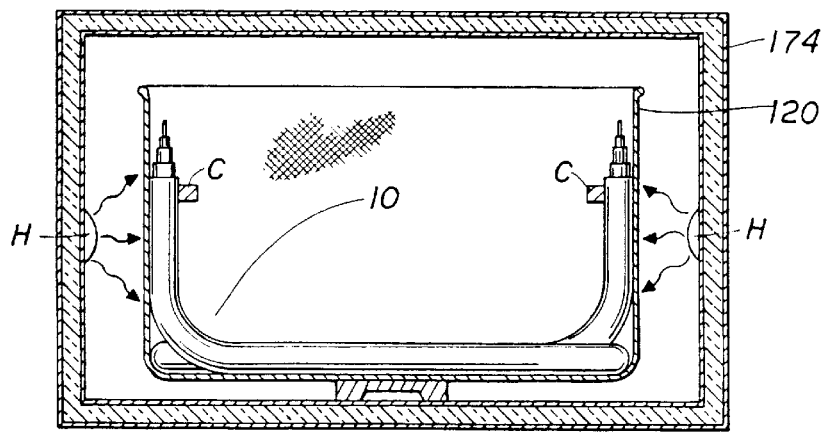
FIG. 10 is a sectional view of the basket and the cable placed in an oven.
Figure 11:
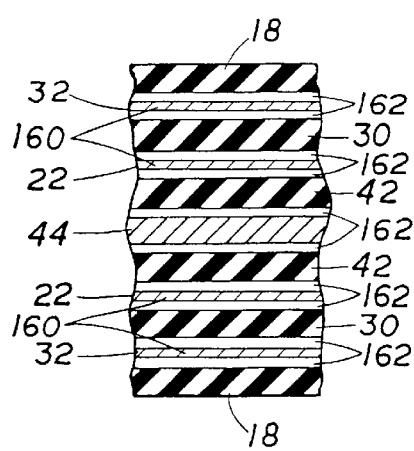
FIG. 11 is a sectional view of a portion of the cable shown in FIG. 2 revealing plural stratas radiating from a center strata to an ultimate strata before being impregnated with the sealing composition.
Figure 12:
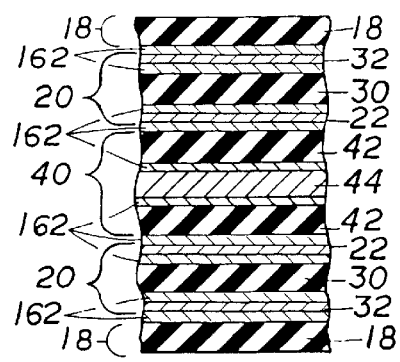
FIG. 12 is a sectional view of a portion of the cable shown in FIG. 3 revealing plural stratas radiating from a center strata to an ultimate strata after being impregnated with the sealing composition.

A sealing composition impregnated into at least one area of tangency 162 (see FIGS. 10 and 11) between the penultimate strata 20 and both the ultimate strata 18 and the central strata 40 provides means for precluding fluid wicking and capillary attraction of fluid therebetween. The central strata 40 includes a central insulator 42 carrying a central signal transmission medium 44 extending from the first end 12 to the second end 14. The sealing composition may be impregnated into at least one area of tangency 162 between the central insulator 42 and the signal transmission medium 44 in order to preclude fluid wicking and capillary attraction of fluid within the central strata 40.

Figure 3:
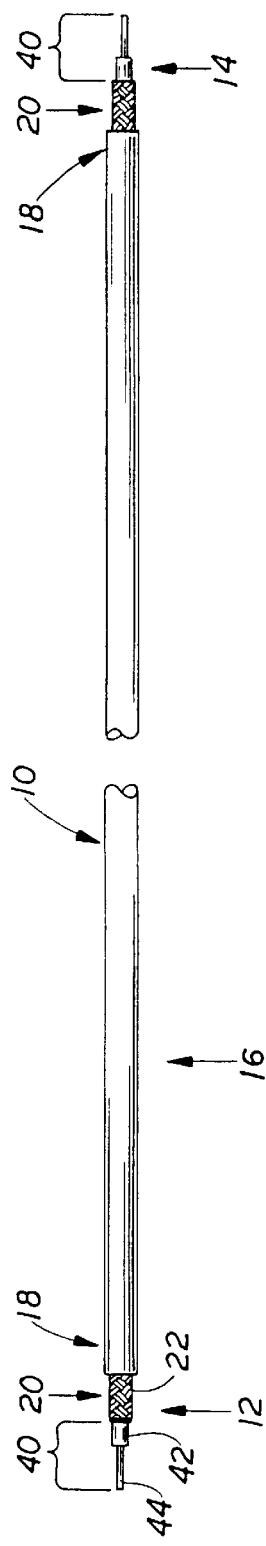
FIG. 3 is a perspective view of an alternative embodiment of the cable shown in FIG. 2.

More specifically, and referring to FIGS. 2 and 3, the ultimate strata 18, inter alia, prevents the current which cable 10 carries from leaking away to any conducting material with which the cable 10 may come into contact. Preferably, the ultimate strata 18 is made from a Teflon® type material. This material provides high insulation resistance, high mechanical strength, durability and the capacity to undergo extreme environmental conditions, such as withstanding oil and corrosive chemicals without deterioration. In addition, this material can withstand a fairly wide temperature range. The ultimate strata 18 (or outer protective jacket 18) circumscribes the penultimate strata 20.

Referring to FIGS. 2 and 3, the penultimate strata 20 is comprised of a least one conductor 22. The conductor 22 may be a flexible solid conductor, a stranded conductor or a combination of these two types of conductors. Preferably, the conductor 22 is a stranded conductor and particularly a wire braided conductor 22. The wire braided conductor 22 is preferably made from one of a class of materials characterized as having excellent conductivity, such as copper or copper clad steel with silver flash. The wire braided conductor usually provides a ground connection which communicates the first end 12 with the second end 14. In addition, the wire braided conductor 22 may be effective as a shield which reduces the pickup of interference signals by the central signal transmission medium 44. Furthermore, at high frequencies, the central signal transmission medium 44 may radiate too much energy away from the medium 44 for a strong enough signal to be transmitted by the medium 44. The wire braided conductor 22 substantially eliminates this problem. The cable illustrated in FIG. 2 is commonly referred to as a triaxial cable and the cable illustrated in FIG. 3 is commonly referred to as a coaxial cable. Referring to FIG. 2, the cable 10 is substantially identical to the cable 10 shown in FIG. 3 with the exception of at least one additional conductor 32.

Preferably, the braided conductor 22 is circumscribed by the conductor 32 and is separated therefrom by an insulator 30 which circumscribes the braided conductor 22. The conductor 32 may be a flexible solid conductor, a stranded conductor or a combination of the two conductors. Preferably, conductor 32 is a stranded conductor and particularly a braided sheath 32. The braided sheath 32 is preferably formed from armored shield. The braided sheath 32 is preferably used to provide additional shielding and mechanical integrity to the cable 10. In addition, if the ultimate strata 18 becomes damaged, the braided sheath 32 prevents the braided conductor 22 from being shorted to ground by inadvertently contacting a grounded element such as a machine casing or conduit.

The penultimate strata 20 circumscribes a central strata 40. The central strata 40 includes a central insulator 42 surrounding at least one central signal transmission medium 44. The central insulator 42 is usually an insulator or dielectric which surrounds the central signal transmission medium 44 and separates it from the braided conductor 22. The central signal transmission medium 44 may include a plurality of conductors each of which is a stranded wire conductor, a solid conductor or a combination of the two. Preferably, the medium 44 is a solid conductor formed from various alloys.

When the cable is manufactured, a plurality of interstices are formed at areas of tangency 162 between the adjacent plural stratas. Specifically, a plurality of interstices are formed at the areas of tangency 162 between the ultimate strata 18 and the penultimate strata 20 and also, at the areas of tangency 162 between the penultimate strata 20 and the central strata 40. In addition, a plurality of interstices may pervade each of the plural stratas themselves.

Figure 9:
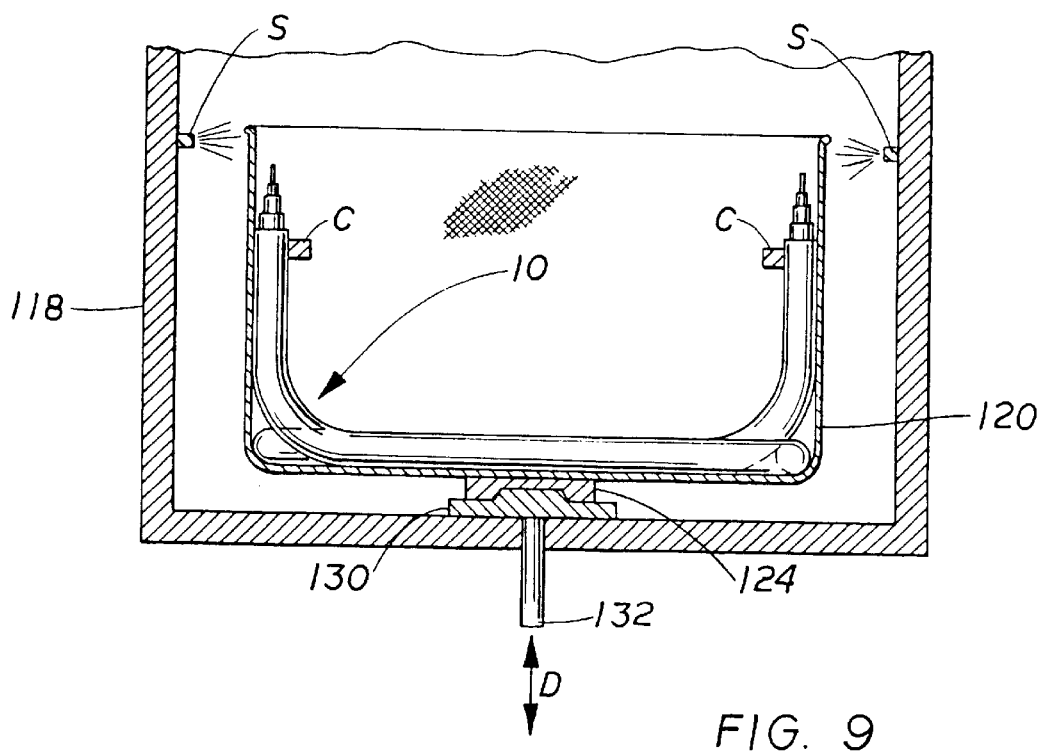
FIG. 9 is a sectional view of an agitator for vertically agitating the basket within a bath.

For example, the penultimate strata 20 includes a plurality of interstices defined by spaces 160 interposed between the wire strands forming the braided conductor 22 and the braided sheath 32 (FIG. 9). Furthermore, the penultimate strata 20 includes a plurality of interstices at the areas of tangency 162 between the insulator 30 and both the braided conductor 22 and the braided sheath 32.

The central strata 40 includes interstices spread throughout the areas of tangency 162 between the central insulator 42 and the central signal transmission medium 44. Interstices may also permeate throughout the central signal transmission medium 44 particularly when formed from a plurality of elements.

The plurality of interstices pervading throughout the cable 10 may provide leakage paths for fluid to travel from one environment to another via the interior or the penultimate and ultimate stratas of the cable 10, or in other words, within the ultimate strata 18.

A sealing composition such as that manufactured by Loctite under the name "Flexseal XT" is preferably impregnated into at least one area of the cable 10 in order to fill the plurality of interstices defined by spaces 160 and areas of tangency 162, in order to provide a barrier against the flow of fluid within the interior of the cable 10. For example, and referring to FIG. 10, the sealing composition may be impregnated into areas of tangency 162 between the penultimate strata 20 and both the ultimate strata 18 and the central strata 40. The sealing composition may also be impregnated within the penultimate strata 20. Specifically, the sealing composition may be impregnated into areas of tangency 162 between the insulator 30 and both the braided conductor 22 and the braided sheath 32. In addition, the sealing composition may be impregnated into at least one area of the braided conductor 22 and/or the braided sheath 32 in order to fill the spaces 160 therein. The sealing composition may also be impregnated within the central strata 40. Specifically, at areas of tangency 162 between the central signal transmission medium 44 and the central insulator 42. Typically, when any of the areas of tangency 162 are impregnated with the sealing composition, the plurality of spaces 160 adjacent thereto are also impregnated as well. Impregnating the cable 10 with the sealing composition provides the means for precluding fluid wicking and capillary attraction of fluid between and within the respective plural stratas 18, 20 and 40.

Figure 5:
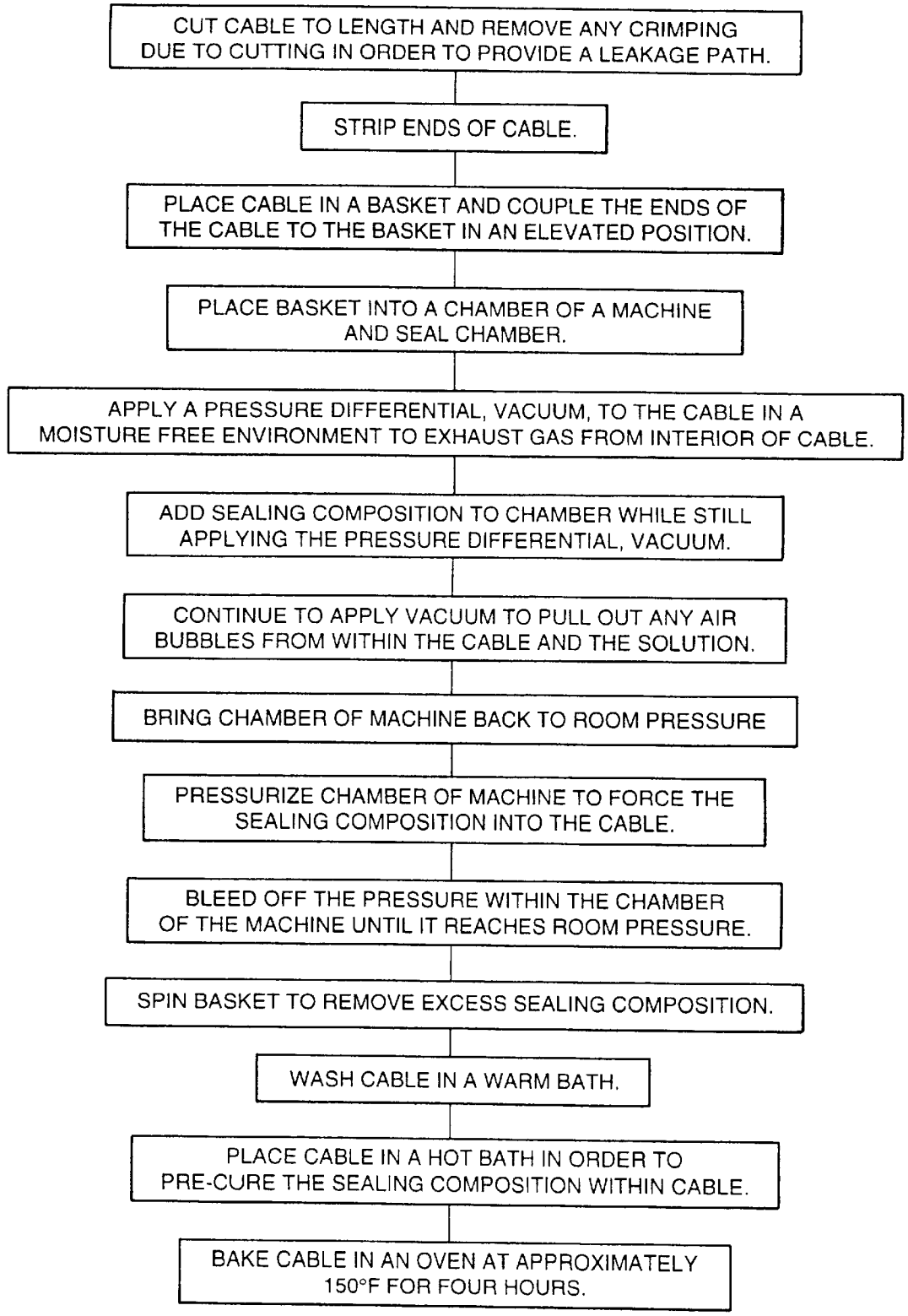
FIG. 5 is a block diagram of the method according to the present invention which is used to impregnate a cable with a sealing composition and then curing the sealing composition therein.

Referring to FIG. 5, the first step in impregnating the cable 10 with the sealing composition is to provide at least one leakage path for the sealing composition to flow into the cable 10 in order to occupy the plurality of interstices defined by spaces 160 and areas of tangency 162 within the interior of the cable 10. This is accomplished by preferably cutting the cable 10 to a desired length and then removing any crimping at the ends 12, 14 of the cable 10 due to the cutting action. In addition, if the ends of the braided conductor 22 and/or the braided sheath 32 are soldered, one must be careful that the wicking of the solder paste and flux does not seal off the desired leakage paths at the ends 12, 14 of the cable 10.

Figure 6:
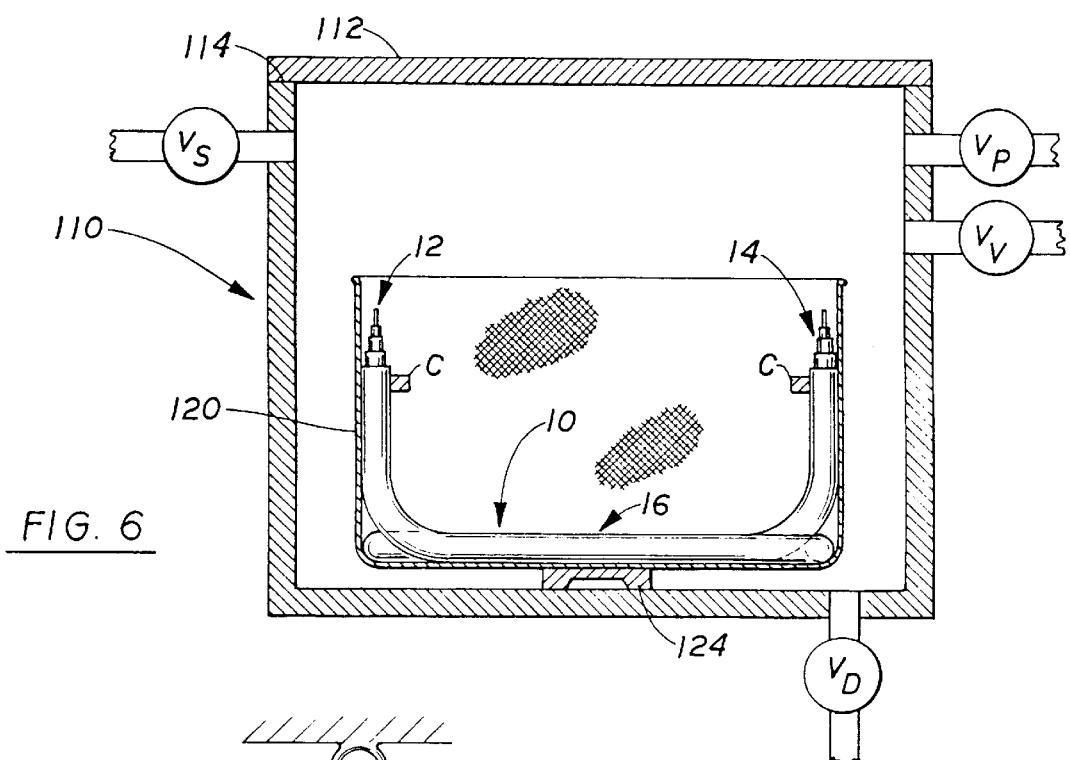
FIG. 6 is a sectional view of a basket having the cable coupled thereto and placed in a chamber of a machine which is also shown in section.

Once the ends 12, 14 of the cable 10 are provided with the desired leakage paths to the interior of the cable 10, the cable 10 is preferably placed within a wire mesh-type basket 120 shown in FIG. 6. Each end 12 and 14 of the cable 10 which is provided with at least one leakage path is operatively coupled to the basket 120 in an elevated position with respect to the intermediate portion 16 of the cable 10. Preferably, the ends of the cable 10 are coupled to the basket 120 by releasable clamps C shown in FIG. 6. By elevating the ends 12, 14 of the cable 10 which include at least one leakage path, the liquid sealing composition which is impregnated into the cable 10 does not flow back out prior to a process of curing the composition.

Now that the cable 10 has been properly coupled to the basket 120, the basket 120 is placed within a chamber 110 of a machine (FIG. 6). Preferably, the machine is a pressure vessel and is manufactured by Loctite. The chamber 110 of the machine is sealed by closing the top 112 of the chamber 110. Then, a pressure differential, i.e., a vacuum, is applied by opening valve $V_v$, thereby providing a pull system for exhausting gas from the interior of the cable 10 and from the substantially moisture free chamber 110. The liquid sealing composition is then added by actuating valve $V_s$ to an open position. The valve $V_s$ remains opened to allow enough sealing composition to be added in order to completely submerge the cable 10 or at least come in contact with one or more leakage paths provided at one or both ends 12 and 14 of the cable 10. Note that the pressure differential (vacuum) is continuously applied during the process of adding the sealing composition in order to pull out any air bubbles which have formed within the solution itself.

Once this step of the process is completed, the pressure differential (vacuum) is removed by closing valve $V_v$ and the chamber 110 is bled back to room pressure. Then, the chamber 110 is pressurized. The added pressure in the chamber 110 forces the sealing composition within the interior of the cable 10. This is the actual impregnation or infusion step of the process and preferably, the pressure used is approximately 100 pounds per square inch. In the alternative, a push (pressure)—pull (vacuum) system could be used in concert by communicating the liquid source and pressure source to the end 12 of the cable remote from the vacuum source which is directly connected via a line to the end 14 of the cable 10.

The next step is to bleed off the pressure of the chamber so that it is brought back down to room pressure. If desired, the sealing composition may be drained from the chamber 110 by opening a drain valve $V_d$. The top 112 of the chamber 110 is then opened and the basket 120 may be removed from the chamber 110.

Figure 7:
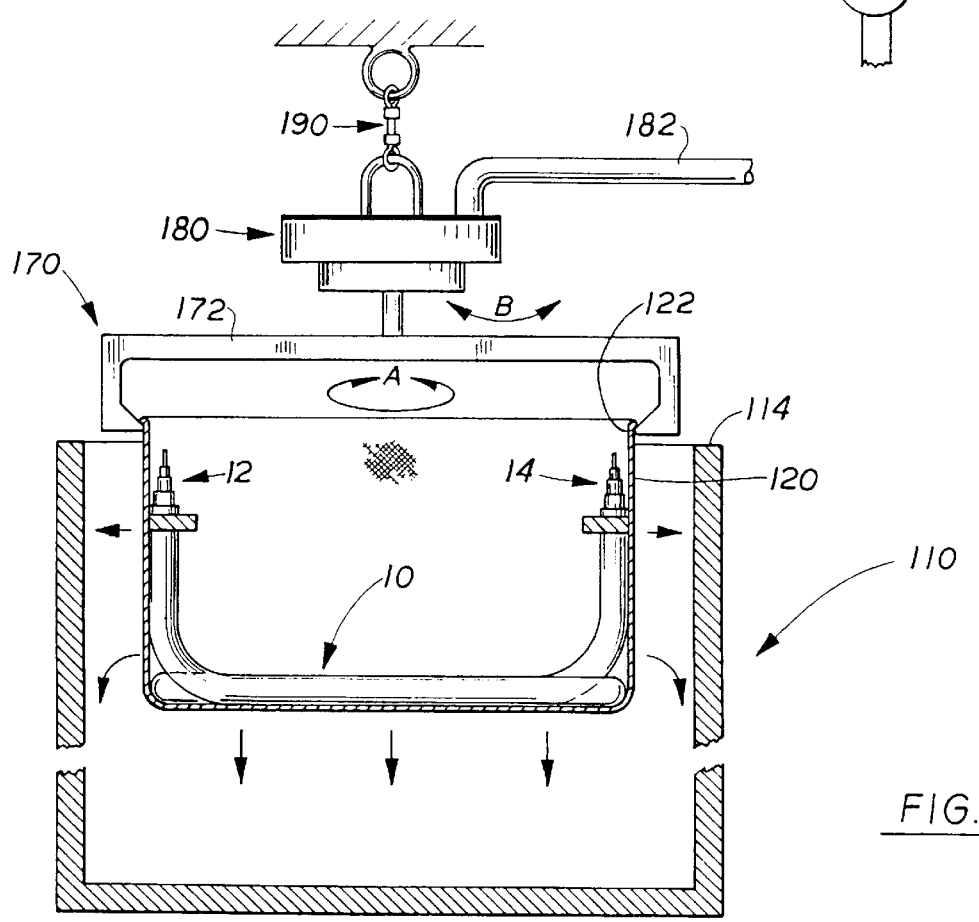
FIG. 7 is a sectional view of a spinner coupled to the basket having the cable coupled thereto so that the basket and cable can be rotated.

Referring to FIG. 7, a basket clamping support fixture 170 is clamped to the outside top edge 122 of the basket 120. The top 172 of the basket clamping support fixture 170 is connected to a pneumatic spinner device 180 which is secured to a support cord 190. The basket 120, with the secured cable 10, is pulled out of the chamber 110 by pulling up on the support cord 190. The basket 120 and cable 10 are preferably positioned so that the ends 12, 14 of the cable 10 are not above the top edge 114 of the chamber 110 and the basket 120 is still within the surface of the chamber 110. Pressurized air flows through tube 182 and is applied to the pneumatic spinner device 180. The pneumatic spinner device 180 spins the basket clamping support fixture 170, the basket 120 and the cable 10 about arrow "A" at approximately 130 revolutions per minute.

Because the basket 120 and the cable 10 are covered with sealing composition, the assembly hanging below the pneumatic spinner 180 will be out of balance. As the cable 10 and related parts spin, they will also bounce about arrow "B". This spinning and bouncing action removes the sealing composition which is then reclaimed in the chamber 110 so that it may be reused. Note that the spinning speed should not be increased too much because the rotational forces may force the sealing composition out of the cable 10.

Alternatively, the basket 120 may be placed in a container 118 and spun about arrow "C" (FIG. 8) in order to remove some of the excess sealing composition off the ultimate strata 18 (or outer jacket) and out of areas immediately proximate the ends 12, 14 of the cable 10. The spinning action is accomplished, for example, by a coupler 130 having one end attachable to the bottom 124 of the basket 120 and another end attachable to a shaft 132 coupled to a motive means source. This spinning action is preferably done at a low enough speed to allow the uncured sealing composition to be retained within the intermediate portion 16 of the cable 10.

Next, the cable 10 is either sprayed using sprayer S (FIG. 8) or washed by, for example, agitating the basket 120 up and down about arrow "D" (FIG. 8) in a bath comprised of water and a mild detergent. The shaft 132 and coupler 130 which are attachable to the bottom 124 of the basket 120 may be used to agitate the basket 120 about arrow "D". After the first bath, the basket 120 is either sprayed or placed into a second bath of clean water and then into an activator solution. The temperature of the solutions used in the washing cycle are preferably elevated. Particularly, a hot water bath is preferably provided for conditioning the cable in order to pre-cure the sealing composition which has been impregnated into the cable 10. As a result of the sealing composition being water soluble in its liquid form, the washing cycle completely cleans the liquid sealing composition off of the ends 12, 14 and off the ultimate strata 18 of the cable 10.

Figure 8:
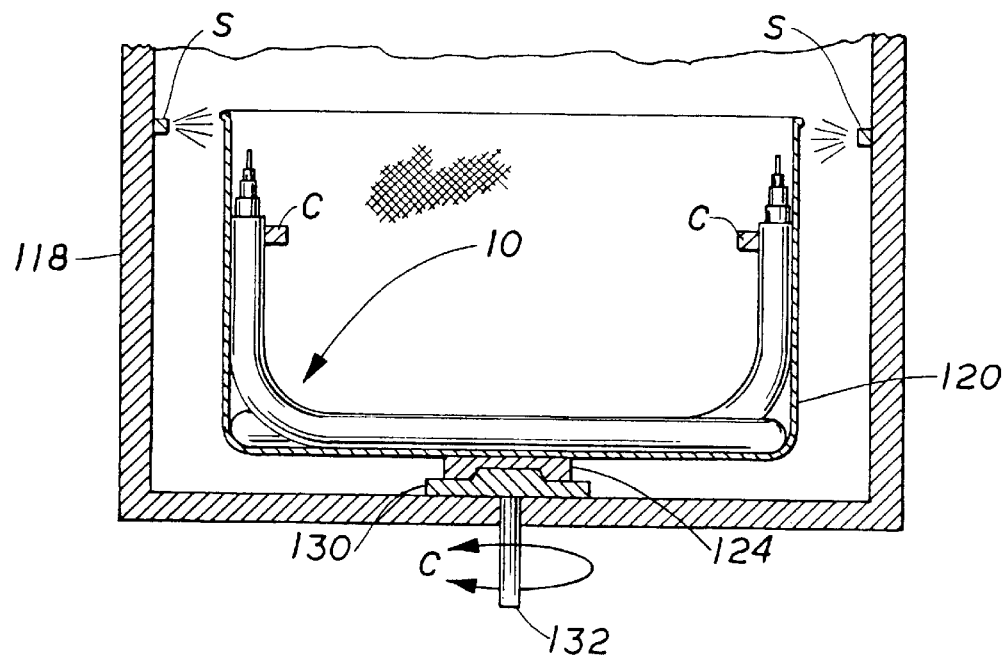
FIG. 8 is a sectional view of an alternative embodiment of the spinning mechanism shown in FIG. 7.

Finally, the sealing composition is cured or coagulated within the interior of the cable 10 by a curing agent or a heat source H. The sealing composition is designed to cure when it reacts with an activator-type of material such as copper. However, it has been found that a heat source H properly cures the solution when the cable 10 does not include an activator-type of material. Preferably, the basket 120 having the cable 10 still coupled thereto is put into an oven 174 and baked by a heat source H as shown in FIG. 8. The sealing composition properly cures when baked in the oven 174 at approximately 150° F. for four hours. This renders the interior of the cable 10 substantially impervious to fluid wicking and capillary attraction of fluid along the interior of the cable 10. The cable 10 becomes semi-rigid after the sealing composition is completely cured in the oven 174.

Figure 4:
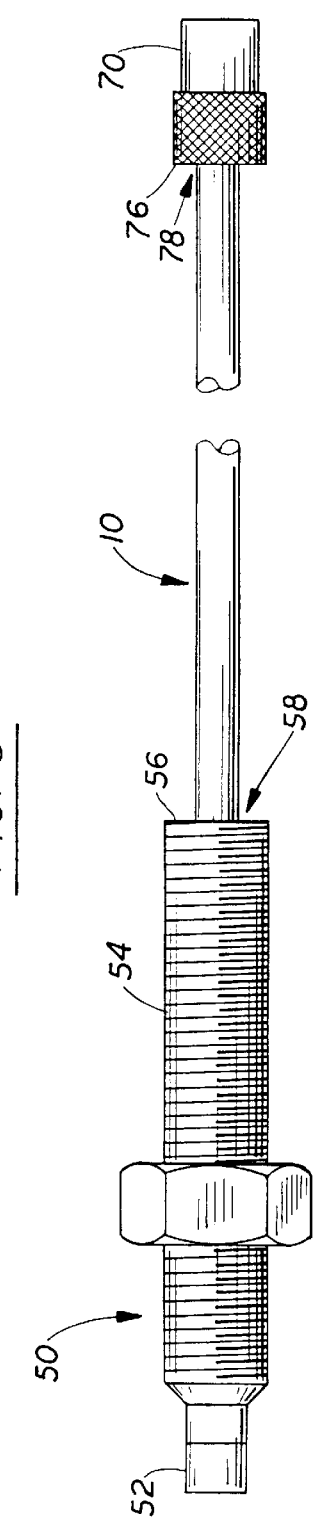
FIGS. 4 is a perspective view of the cable shown in FIG. 2 with one end operatively coupled to a transducer and the other end operatively coupled to a connector.

Referring to FIGS. 2 and 4, the ends 12, 14 of the cable 10 are usually operatively coupled to a transducer 50 or some type of connector 70. As a result, it is preferred that a length proximate the ends 12, 14 of the cable 10 retain their original flexibility. This is accomplished by stripping off a desired length of the ultimate strata 18, proximate the ends 12, 14 of the cable 10. In addition, a length of the insulator 30 and the central insulator 42 are stripped away preferably in a step like fashion. This stripping process reveals a length, proximate the ends 12, 14 of the cable 10, of the braided conductor 22, the braided sheath 32 and the central signal transmission medium 44. Stripping the ends of the cable 10 in a step-like fashion is preferably done when the ends of the cable 10 are being provided with ample leakage paths. As a result of the ends of the cable 10 being stripped away in a step-like fashion, the washing cycle completely cleans the liquid sealing composition out of an area proximate the ends 12, 14 and particularly out of the exposed lengths of the braided conductor 22, the braided sheath 32 and the central signal transmission medium 44.

It may be desired to impregnate an area of the cable adjacent to only one of the two ends 12, 14. In this case, leakage paths at only one end of the cable 10 may be required and the opposite end may be sealed or capped off as desired. In addition, both ends of the cable 10 may be sealed or capped off with the exception of strategic leakage paths for impregnating the sealing composition into a particular strata and/or adjacent areas therebetween. Particularly, it may be desired to only impregnate the braided conductor 22 and/or the braided sheath 32 at an area adjacent the first end 12 and/or the second end 14. Furthermore, it may be desired to only impregnate the braided conductor 22 and/or the braided sheath 32 at the intermediate portion 16.

Figure 13:
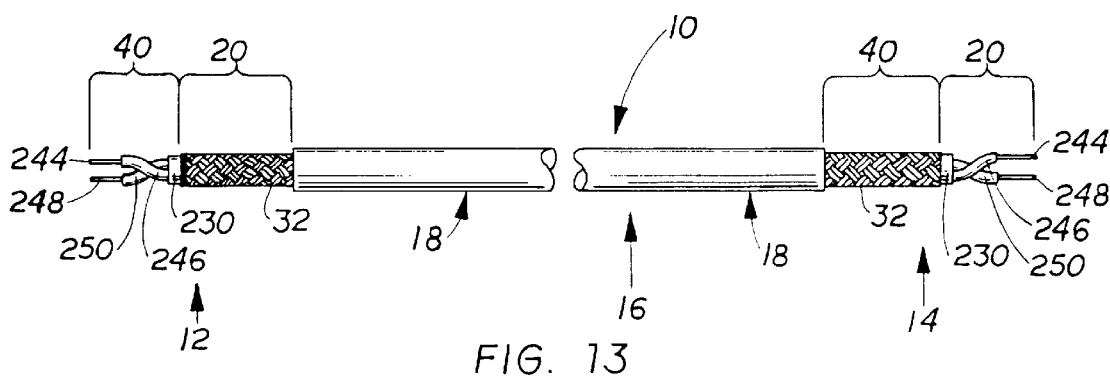
FIG. 13 is a perspective view of a second alternative embodiment of the cable shown in FIG. 2.

The method described above for impregnating the sealing composition within a coaxial or triaxial cable may also be used in impregnating a variety of different types of wire or cable such as solid or standard hook-up wire, twisted pair cable, multi-conductor cable wherein the conductors are not concentrically disposed and also fiber optic cable. For example, and referring to FIG. 13, the cable 10 includes an ultimate strata 18 (or outer protective Jacket 18) circumscribing a penultimate strata 20. The penultimate strata 20 preferably includes at least one sheath 32. The sheath 32 may be formed as a flexible solid, a stranded solid or a combination of the two. Preferably, sheath 32 is formed as a stranded solid from conductive material and particularly, is formed as a braided sheath 32.

The penultimate strata 20 circumscribes a central strata 40. The central strata 40 includes a plurality of signal transmission mediums such as for example, a twisted pair of central conductors 244, 248. The central conductors 244 and 248 are isolated from one another by their respective surrounding insulators 246, 250. In addition, the central strata 40 may include an insulator 230 surrounding the plurality of central conductors 244, 248 and separating them from the braided sheath 32. The conductors 244, 248 are preferably solid conductors but may be of a stranded wire type or a combination of the two.

The cable 10 is impregnated in the same manner delineated above for precluding fluid wicking and capillary attraction of fluid within the interior or ultimate strata 18. Particularly, the sealing composition is impregnated into at lest one area of the cable 10 in order to fill the plurality of interstices defined by spaces 160 in the braided sheath 32 and areas of tangency between the braided sheath 32 and both the ultimate strata 18 and, if included, the insulator 230. In addition, the sealing composition may be impregnated within the central strata 40 in order to fill the interstices between the insulators 246, 250 surrounding the respective conductors 244, 248. Furthermore, the sealing composition may be impregnated into at least one area of tangency between the insulators 246, 250 and the insulator 230 or, if not provided, the braided conductor 32.

In use and operation, upon completing the above delineated method of impregnating a desired area of the cable 10 with the sealing composition and curing this composition therein, the ends 12, 14 of the cable 10 are operatively coupled to the transducer 50 and the connector 70 respectively (FIG. 4). Retaining the original flexibility at an area proximate the end 12 of the cable 10 is particularly important as a result of the end 12 being required to make several very sharp angle bends when operatively coupled to the transducer 50. In addition, and referring to FIG. 1, the original flexibility at the area proximate the end 12 allows the cable 10 to make an additional sharp angle bend at an area 58 where it exits at a back end 56 of the transducer casing 54. Furthermore, the original flexibility at an area proximate end 14 allows the cable 10 to make a sharp angle bend at an area 78 where the cable 10 exits at a back end 76 of the connector 70.

Referring to FIG. 1, the impregnated cable 10 communicate the parameters of, for example, the rotating machine 80 from the transducer 50 juxtaposed to a rotating shaft 86 of the machine 80 to a processing unit 150 remote from the rotating machine 80. A portion of the impregnated cable 10 resides within a machine case 82 of the rotating machine 80. A mounting means 88 is used to strategically mount the transducer 50 with respect to a rotating shaft 86 of the machine 80. The cable 10 is routed through the machine case 82, preferably by way of an adapter 90 which includes an internal rubber grommet 92. The cable 10 runs through the internal rubber grommet 92. The rubber grommet 92 prevents leakage of fluid through the machine case 82 via the outside of the ultimate strata 18.

A first threaded end 94 of the adapter 90 couples with a threaded bore 84 in the machine case 82 in order to firmly mount the adapter 90 to the machine case 82. A second threaded end 96 of the adapter 90 may be coupled to a threaded aperture 104 in a junction box 102 for the purpose of mounting the junction box 102 to the machine case 82. Alternatively, a transducer casing 54 of the transducer 50 may be operatively coupled directly into the threaded bore 84 of the machine case 82.

End 14 of the cable 10 preferably terminates to a connector 70 outside of the machine case 82. The connector 70 can then be directly coupled to a processing unit 150 or to an extension cable 140 used to couple the connector 70 of cable 10 to a processing unit 150 remotely located from the machine 80.

As mentioned, the rubber grommet 92 substantially prevents leakage of fluid through the machine case 82 via the outside surface of the ultimate strata 18. In addition, the sealing composition precludes leakage of fluid through the machine case 82 via the interior of the cable 10.

Because of the harsh environment typically found within the machine 80, the ultimate strata 18 may become cut or cracked thereby revealing the braided sheath 32 and in time the braided conductor 22. When the fluid, typically oil, comes in contact with the braided conductor 22 and/or the braided sheath 32, it had heretofore been wicked up and transferred from one location to another via capillary attraction between the fluid and the braided conductor 22 and/or the braided sheath 32. This had caused the oil to be transferred from an environment where it is safely contained to a location outside of the machine 80 where it causes a safety and an environmental hazard. The present invention prevents this.

Furthermore, a tip 52 of the transducer 50 may become cut or cracked and the oil may come in contact with the interior of the cable 10. Heretofore, the oil would have been wicked up and transferred by one or more of the following: the signal transmission medium 44; the braided conductor 22; and the braided sheath 32. Once again, this would have resulted in oil being transferred from an environment where is safely contained to a location outside of the machine 80 where it would have caused a safety and an environmental hazard. The present invention makes such events less likely.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A cable for use in monitoring a machine, comprising in combination:
    a first end and a second end;
    a central conductor extending through a center of said cable and communicating said first end with said second end;
    a central insulator circumscribing said central conductor and substantially coaxially aligned therewith;
    a braided conductor circumscribing said central insulator and substantially coaxially aligned therewith, said braided conductor formed from a plurality of braided strands having interstices therebetween;
    a sealing composition impregnated into at least one area of tangency between said braided conductor and said central insulator and impregnated into said interstices of said braided conductor adjacent said at least one area of tangency between said braided conductor and said central insulator wherein said sealing composition precludes fluid wicking and capillary attraction of fluid along said braided conductor;
    said first end of said cable devoid of said sealing composition;
    a transducer electrically connected to said first end of said cable at a location devoid of said sealing composition for communicating information for use in monitoring said machine.

2. The cable of claim 1 wherein said braided conductor is impregnated with the sealing composition at an area adjacent said first end.

3. The cable of claim 2 wherein said braided conductor is impregnated with the sealing composition at an area adjacent said second end.

4. The cable of claim 3 wherein said braided conductor is impregnated with the sealing composition at an intermediate portion between said first end and said second end.

5. The cable of claim 4 wherein the sealing composition is impregnated into at least one area of tangency between said central conductor and said central insulator.

6. The cable of claim 5 wherein said braided conductor is circumscribed by a braided sheath and is separated from said braided conductor by an insulator.

7. The cable of claim 6 wherein said braided sheath is circumscribed by an outer jacket and the sealing composition is impregnated into at least one area of tangency between said braided sheath and said outer jacket.

8. The cable of claim 1 wherein said transducer is positioned adjacent a shaft of said machine and is operatively coupled to both said central conductor and said braided conductor at said first end of said cable and wherein said cable is operatively coupled to a processing unit at said second end of said cable after being routed through a casing of said machine.

9. A triaxal cable for use in monitoring a machine, comprising in combination:
    a first end and a second end;
    a central conductor extending through a center of said cable and communicating said first end with said second end;
    a central insulator circumscribing said central conductor and substantially coaxially aligned therewith;
    a braided conductor circumscribing said central insulator and substantially coaxially aligned therewith, said braided conductor formed from a plurality of braided strands having interstices therebetween;
    a sealing composition impregnated into at least one area of tangency between said braided conductor and said central insulator and impregnated into said interstices of said braided conductor adjacent said at least one area of tangency between said braided conductor and said central insulator wherein said sealing composition precludes fluid wicking and capillary attraction of fluid along, said braided conductor;
    said first end of said cable devoid of said sealing composition;
    a transducer electrically connected to said first end of said cable at a location devoid of said sealing composition;
    an outer insulator circumscribing said braided conductor and substantially coaxially aligned therewith;
    a braided sheath circumscribing said outer insulator and substantially coaxially aligned therewith, said braided sheath formed from a plurality of braided strands having interstices therebetween;
    a sealing composition impregnated into at least one area of tangency between said braided sheath and said outer insulator and impregnated into said interstices of said braided sheath adjacent said at least one area of tangency between said braided sheath and said outer insulator wherein said sealing composition precludes fluid wicking and capillary attraction of fluid along said braided sheath, and
    an outer jacket circumscribing said braided sheath;
    said transducer positioned adjacent a shaft of said machine;
    said cable operatively coupled to a processing unit at said second end of said cable after being routed through a casing of said machine such that said sealing composition precludes fluid and fluid vapor from escaping from said casing through said cable and such that said cable communicates information for use in monitoring said machine.

10. A cable for use in monitoring a machine said cable comprising, in combination:
    a first end and a second end;
    a central strata including a central signal transmission medium extending from said first end to said second end;
    a penultimate strata circumscribing said central strata;
    an ultimate strata circumscribing said penultimate strata and including a braided sheath formed from a plurality of braided strands having interstices therebetween;
    means for precluding fluid wicking and capillary attraction of fluid between said penultimate strata and said ultimate strata such that said fluid precluding means is impregnated into said interstices of said braided sheath and wherein said first end of said cable is devoid of said fluid precluding means;

a transducer operatively coupled to said first end of said cable at a location devoid of said sealing composition;

said cable operatively coupled to a processing unit at said second end of said cable after being routed through a casing of said machine such that said fluid precluding means precludes fluid and fluid vapor from escaping from said casing through said cable and such that said cable communicates information for use in monitoring said machine.

11. The cable of claim 10 including means for precluding fluid wicking and capillary attraction of fluid between said penultimate strata and said central strata.

12. The cable of claim 11 including means for precluding fluid wicking and capillary attraction of fluid within said penultimate strata.

13. The cable of claim 12 including means for precluding fluid wicking and capillary attraction of fluid within said central strata.

14. A cable for use in monitoring a machine, comprising in combination:

a first end and a second end;

at least one sheath extending between said first end and said second end, and including a plurality of braided strands having interstices therebetween;

an outer jacket circumscribing said sheath;

a sealing composition impregnated into at least one area of tangency between said sheath and said outer jacket and substantially filing the interstices between said braided strands of said sheath along said at least one area wherein said sealing composition precludes fluid wicking and capillary attraction of fluid along said sheath;

a plurality of conductors circumscribed by said sheath;

an insulator interposed between said plurality of conductors and said sheath, wherein said plurality of conductors includes at least one braided conductor having interstices between strands forming said braided conductor and a sealing, composition impregnated into said interstices of said braided conductor such that said first end of said cable is devoid of said sealing composition and wherein said sealing composition precludes fluid wicking and capillary attraction of fluid along said braided conductor;

a transducer operatively coupled to said first end of said cable at a location devoid of said sealing composition and positioned adjacent a shaft of said machine, and said cable operatively coupled to a processing unit at said second end of said cable after being routed through a casing of said machine such that said sealing composition precludes fluid and fluid vapor from escaping from said casing and such that said cable communicates information for use in monitoring said machine.

15. The cable of claim 14 wherein said braided conductor is separated from said sheath by an insulator.

16. The cable of claim 15 wherein the sealing composition is impregnated in at least one area of tangency between said sheath and said insulator.

17. The cable of claim 16 wherein the sealing composition is impregnated into at least one area of tangency between said insulator and said braided conductor.

18. The cable of claim 17 wherein said plurality of conductors includes at least one central conductor separated from said braided conductor by a central insulator.

19. The cable of claim 18 wherein the sealing composition is impregnated into at least one area of tangency between said braided conductor and said central insulator.

20. The cable of claim 19 wherein the sealing composition is impregnated into at least one area of tangency between at least one said central conductor and said central insulator.

21. The cable of claim 20 wherein at least one said central conductor is a solid conductor.

22. The cable of claim 20 wherein at least one said central conductor is a stranded conductor.

23. A cable for use in monitoring the status of rotating equipment formed from the steps of:

providing a central conductor communicating a first end of said cable with a second end of said cable;

circumscribing the central conductor with an insulator;

circumscribing the insulator with a braided conductor having a plurality of braided strands having interstices therebetween;

infusing sealing composition into at least one area of tangency between the braided conductor and the insulator and within the interstices;

removing any infused sealing composition from the first end of said cable for allowing the first end of said cable to be devoid of the sealing composition;

coagulating the sealing composition to impede fluid wicking and capillary attraction of fluid along the braided conductor of said cable;

providing a transducer;

connecting the transducer to the first end of said cable at a location devoid of the sealing composition;

positioning the transducer adjacent a shaft of the rotating equipment for generating a signal;

routing said cable through a casing of the rotating equipment, and connecting the second end of the cable to a processing unit for interpreting the signal such that said cable impedes fluid and fluid vapor form escaping from the casing through said cable by wicking and capillary attraction.

24. The cable of claim 23 wherein coagulating the sealing, composition includes the step of curing the sealing composition.

25. The cable of claim 24 wherein curing the sealing composition infused within the interior of said cable includes the step of heating the cable.

26. A cable for use in monitoring a machine, comprising in combination:

a first end and a second end;

a twisted pair of insulated conductors extending along a center of said cable from said first end to said second end of said cable;

an insulator circumscribing said twisted pair of insulated conductors;

at least one sheath circumscribing said insulator and including a plurality of braided strands having interstices therebetween;

an outer jacket circumscribing said sheath;

a sealing composition impregnated into at least one area of tangency between said sheath and said outer jacket and impregnated into said interstices of said sheath adjacent said at least one area of tangency between said sheath and said outer jacket wherein said sealing composition precludes fluid wicking and capillary attraction of fluid along said sheath;

said first end of said cable devoid of said sealing composition;

a transducer electrically connected to said first end of said cable at a location devoid of said sealing composition;

said transducer positioned adjacent a shaft of said machine;

said cable operatively coupled to a processing unit at said second end of said cable after being routed through a casing, of said machine such that said sealing composition precludes fluid and fluid vapor from escaping from said casing through said cable by fluid wicking and capillary attraction and such that said cable communicates information for use in monitoring said machine.

27. The cable of claim 26 wherein the sealing composition is impregnated into said cable to substantially fill interstices between said twisted pair of insulated conductors and said insulator along a length of said cable, and between said twisted pair of insulated conductors themselves alone said length of said cable.

28. The cable of claim 27 wherein at least one of said twisted pair of insulated conductors is a solid insulated conductor.

29. The cable of claim 27 wherein at least one of said twisted pair of insulated conductors is a stranded insulated conductor.

30. The cable of claim 26 wherein the sealing composition is impregnated into at least one area of tangency between said insulator and said sheath.

* * * * *